United States Patent
Bergström et al.

(10) Patent No.: US 11,026,135 B2
(45) Date of Patent: Jun. 1, 2021

(54) CONTROLLING THE OPERATION OF MOBILE TERMINALS WITH RESPECT TO MULTIPLE RADIO ACCESS TECHNOLOGIES

(71) Applicant: Telefonaktiebolaget LM Ericsson (publ), Stockholm (SE)

(72) Inventors: Mattias Bergström, Stockholm (SE); Gunnar Mildh, Sollentuna (SE); Magnus Stattin, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 650 days.

(21) Appl. No.: 15/035,641

(22) PCT Filed: Nov. 4, 2014

(86) PCT No.: PCT/SE2014/051297
§ 371 (c)(1),
(2) Date: May 10, 2016

(87) PCT Pub. No.: WO2015/069173
PCT Pub. Date: May 14, 2015

(65) Prior Publication Data
US 2016/0277978 A1  Sep. 22, 2016

Related U.S. Application Data

(60) Provisional application No. 61/902,362, filed on Nov. 11, 2013.

(51) Int. Cl.
*H04W 36/00* (2009.01)
*H04W 48/16* (2009.01)
*H04W 36/22* (2009.01)
*H04W 48/14* (2009.01)
*H04W 84/12* (2009.01)

(52) U.S. Cl.
CPC ....... *H04W 36/0061* (2013.01); *H04W 36/22* (2013.01); *H04W 48/16* (2013.01); *H04W 48/14* (2013.01); *H04W 84/12* (2013.01)

(58) Field of Classification Search
CPC ........ H04W 48/18; H04W 84/12; H04W 4/06
See application file for complete search history.

(56) References Cited

U.S. PATENT DOCUMENTS 7,924,785 B2   4/2011   Shaheen et al.
2003/0134638 A1  7/2003   Sundar et al.
(Continued)

FOREIGN PATENT DOCUMENTS

EP  1545146 A2  6/2005
EP  2498551 A1  9/2012
(Continued)

OTHER PUBLICATIONS

3GPP, "3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11)", 3GPP TS 24.234 V11.2.0, Mar. 2012, 1-41.
(Continued)

*Primary Examiner* — Thai Nguyen
(74) *Attorney, Agent, or Firm* — Murphy, Bilak & Homiller, PLLC

(57) ABSTRACT

According to an aspect, there is provided a method of operating a mobile device in a communication network. The method comprises receiving a list of wireless local area network (WLAN) identifiers from the communication network (600). Using the received list of WLAN identifiers in an access network selection and/or traffic steering procedure (610).

16 Claims, 11 Drawing Sheets

(56) References Cited

U.S. PATENT DOCUMENTS

| | | |
|---|---|---|
| 2005/0148299 A1 | 7/2005 | Buckley |
| 2005/0153692 A1 | 7/2005 | Hwang et al. |
| 2011/0093913 A1 | 4/2011 | Wohlert et al. |
| 2012/0079567 A1* | 3/2012 | Van De Groenendaal ............... H04L 63/102 726/4 |

FOREIGN PATENT DOCUMENTS

| | | |
|---|---|---|
| EP | 2512188 A1 | 10/2012 |
| WO | 0072609 A1 | 11/2000 |
| WO | 2005089249 A2 | 9/2005 |
| WO | 2012092935 A1 | 7/2012 |
| WO | 2014110380 A1 | 7/2014 |
| WO | 2014112940 A1 | 7/2014 |

OTHER PUBLICATIONS

3GPP, "3rd Generation Partnership Project; Technical Specification Group Services and System Aspects; Study on Wireless Local Area Network (WLAN) netwoek selection for 3GPP terminals; Stage 2 (Release 12)", Draft 3GPP TR 23.865 V12.0.0rm, Oct. 2013, 1-45.

Unknown, Author, "(Compromising) WLAN IW Solution for UEs with and without ANDSF", NSN et al., 3GPP TSG-RAN WG2 Meeting #83, R2-132327, Barcelona, Spain, Aug. 19-23, 2013, 1-5.

3GPP, "3rd Generation Partnership Project; Technical Specification Group Radio Access Network; Study on WLAN/3GPP Radio Interworking (Release 12)", 3GPP TR 37.834 V1.0.0, Aug. 2013, 1-14.

3GPP, "Considerations on WLAN Interworking Solution 1 for Deployment Without ANDSF", 3GPP TSG RAN WG2 Meeting #83, R2-132882, Intel Corporation, AT&T, InterDigital Communications, Samsung, Sequans, KDDI, Vodafone, Barcelona, Spain, Aug. 19-23, 2013, 1-4.

3GPP, "Solution Supporting Deployment with and without ANDSF", 3GPP TSG-RAN WG RAN3#83bis, R2-133490, Alcatel-Lucent, Alcatel-Lucent Shanghai Bell, AT&T, InterDigital, Ljubljana, Slovenia, Oct. 7-11, 2013, 1-3.

3GPP, "WLAN Identifier Provisioning", 3GPP TSG-RAN WG2 #85bis, Tdoc R2-141643, Ericsson, Valencia, Spain, Mar. 31-Apr. 4, 2014, 1-5.

* cited by examiner

CONTROLLING THE OPERATION OF MOBILE TERMINALS WITH RESPECT TO MULTIPLE RADIO ACCESS TECHNOLOGIES

TECHNICAL FIELD

The present disclosure is generally related to wireless communications systems, and is more particularly related to techniques for controlling the operation of mobile terminals with respect to the use of multiple radio access technologies (RATs), such as a wide area wireless communication technology and a wireless local area network (WLAN) technology.

BACKGROUND

The wireless local-area network (WLAN) technology known as "Wi-Fi" has been standardized by IEEE in the 802.11 series of specifications (i.e., as "*IEEE Standard for Information technology—Telecommunications and information exchange between systems. Local and metropolitan area networks—Specific requirements. Part 11: Wireless LAN Medium Access Control (MAC) and Physical Layer (PHY) Specifications*"). As currently specified, Wi-Fi systems are primarily operated in the 2.4 GHz or 5 GHz bands.

The IEEE 802.11 specifications regulate the functions and operations of the Wi-Fi access points or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), and Global System for Mobile Communications (GSM), see Wi-Fi as a wireless technology that can provide good additional support for users in their regular cellular networks.

As used herein, the term "operator-controlled Wi-Fi" indicates a Wi-Fi deployment that on some level is integrated with a cellular network operator's existing network, where the operator's radio access network(s) and one or more Wi-Fi wireless access points may even be connected to the same core network (CN) and provide the same or overlapping services. Currently, several standardization organizations are intensely active in the area of operator-controlled Wi-Fi. In 3GPP, for example, activities to connect Wi-Fi access points to the 3GPP-specified core network are being pursued. In the Wi-Fi alliance (WFA), activities related to certification of Wi-Fi products are undertaken, which to some extent is also driven from the need to make Wi-Fi a viable wireless technology for cellular operators to support high bandwidth offerings in their networks. In these standardization efforts, the term "Wi-Fi offload" is commonly used and indicates that cellular network operators seek means to offload traffic from their cellular networks to Wi-Fi, e.g., during peak-traffic-hours and in situations when the cellular network needs to be off-loaded for one reason or another, e.g., to provide a requested quality-of-service, to maximize bandwidth, or simply for improved coverage.

Using Wi-Fi/WLAN (the two terms are used interchangeably throughout this document) to offload traffic from the mobile networks is becoming more and more interesting from both the operator's and end user's points of view. Some of the reasons for this tendency are:

Additional frequency: by using Wi-Fi, operators can access an additional 85 MHz of radio bandwidth in the 2.4 GHz band and another (close to) 500 MHz in the 5 GHz band.

Cost: From the operator's point of view, Wi-Fi uses unlicensed frequency that is free of charge. On top of that, the cost of Wi-Fi Access Points (APs), both from capital expense (CAPEX) and operational expenses (OPEX) aspects, is considerably lower than that of a 3GPP base station (BS)/enhanced NodeB (eNB). Operators can also take advantage of already deployed APs that are already deployed in hotspots such as train stations, airports, stadiums, shopping malls, etc. Most end users are also currently used to having Wi-Fi for free at home (as home broadband subscriptions are usually flat rate) and public places.

Terminal support: Many User Equipments (UEs), including virtually all smartphones, and other portable devices currently available in the market, support Wi-Fi. In the Wi-Fi world, the term Station (STA) is used instead of UE, and as such the terms UE, STA and terminal/mobile terminal are used interchangeably in this document.

High data rate: Under low interference conditions and assuming the user device is close to the Wi-Fi AP, Wi-Fi can provide peak data rates that outshine that of current mobile networks (for example, theoretically up to 600 Mbps for IEEE 802.11n deployments with MIMO (Multiple Input Multiple Output)).

For a wireless operator, offering a mix of two technologies that have been standardized in isolation from each other raises the challenge of providing intelligent mechanisms for co-existence. One area that needs these intelligent mechanisms is connection management.

As noted above, many of today's portable wireless devices (referred to hereinafter as "user equipments" or "UEs") support Wi-Fi in addition to one or several 3GPP cellular technologies. In many cases, however, these terminals essentially behave as two separate devices, from a radio access perspective. The 3GPP-specified radio access network (RAN) and the UE-based modems and protocols that are operating pursuant to the 3GPP specifications are generally unaware of the wireless access Wi-Fi protocols and modems that may be simultaneously operating pursuant to the 802.11 specifications. Techniques for coordinated control of these multiple radio-access technologies are needed.

In the study item 3GPP TR 37.834 "Study on WLAN/3GPP Radio Interworking v1.0.0 (August 2013) a solution is proposed for providing control of UE access network selection between 3GPP and WLAN in the 3GPP RAN. In this solution (described in Section 6.1.2) rules for when the UE can or should offload traffic to the WLAN is specified in RAN specifications. The RAN provides (through dedicated and/or broadcast signaling) thresholds which are used in the rules.

This solution is applicable to UEs in RRC IDLE and RRC CONNECTED states for E-UTRAN, UE IDLE mode for UTRAN and CELL_FACH, CELL_PCH, URA_PCH and CELL_DCH states for UTRAN).

This solution consists of the steps shown in FIG. 1. For the signaling procedure in FIG. 1, each step is elaborated below.

Step 1:

The RAN (e.g. eNB) provides parameters to the UE through dedicated signaling and/or broadcast signaling.

Step 2:

The UE follows the RAN rules, defined in 3GPP RAN specifications, to perform bi-directional offloading between WLAN and 3GPP. User preference should take precedence.

An example Rule is:

```
if (measured_metricA < threshold1) && (measured_metricB > threshold2) {
    steerTrafficToWLAN( );
} else if (measured_metricA > threshold3) || (measured_metricB < threshold4) {
    steerTrafficTo3gpp( );
}
```

In addition, if the UE has been configured with access network discovery and selection function (ANDSF) rules, the ANDSF rules should not be broken.

SUMMARY

A problem with this and similar solutions is that currently there is no way for the RAN or a mobility management entity (MME) in the core network (CN) to indicate which WLANs should be candidates for RAN-controlled WLAN selection. This means that the UE either would apply RAN thresholds etc. for all WLANs, or a suitable list of WLAN identities needs to be configured by ANDSF or by the end user.

However, using all RAN thresholds for all WLANs is most likely not desired from an end user point of view since the end user might want to connect to private WLANs (which are cheaper for the end user to use) regardless of RAN thresholds.

Also, relying on ANDSF or the end user will not be efficient in case the list of WLANs changes (e.g. due to terminal mobility). It is also envisaged that the solution should work without requiring ANDSF.

Thus, techniques described herein introduce a method for the RAN or MME (or other node in the core network (CN)) to send the UE a list of WLAN identifiers used for RAN controlled WLAN access selection and traffic steering.

Furthermore, mechanisms are introduced where the UE can indicate to the RAN (for example via a core network node) or MME if it has previously received such a list, which can avoid the need to transmit the list every time the UE connects to the network.

It will be appreciated that these lists of WLAN identifiers are not limited to use in the RAN-controlled WLAN access selection solution described above, and they can be used by UEs in other access network selection/traffic steering solutions that are controlled by the network (e.g. RAN or MME) or by the UE.

Further embodiments of these techniques include optional mechanisms for: the UE to indicate that it is capable of receiving the WLAN list (e.g. as a part of the UE radio or network capabilities).

the UE to indicate to the RAN or MME a version number or hash of the current WLAN list it has stored.

the RAN or MME to determine if the list of WLAN identifiers stored in the UE is up to date, or if a new list overwriting or modifying the existing list should be sent to the UE.

the UE to remove the current list of WLAN identifiers due to some mobility or connectivity event (e.g. that the UE moves to another cell, tracking area, etc., that the UE move to idle or detached state).

the UE to indicate to the RAN that it does not have any stored WLAN identifiers list due to some mobility or connectivity event (e.g. that the UE moves to another cell, tracking area, etc., that the UE moves to an idle or detached state).

the network to broadcast on the cell broadcast channel (or send in a dedicated message) an identifier of the WLAN list valid in the current area (cell, tracking area, PLMN).

the UE to compare a received identifier of the WLAN list to the one or more stored WLAN list with associated identifiers.

the UE to request the current valid WLAN list from the network when the current stored list(s) do not match the current WLAN list indicated by the network.

These techniques provide the advantage that it is possible for the RAN to send out a list of WLAN identifiers used for RAN-controlled access selection and traffic steering in a dynamic and efficient way, avoiding the need to rely on higher layer mechanisms.

Example embodiments of some of the techniques disclosed herein are detailed below. However, it should be understood that the list of example embodiments is not intended to be an exhaustive representation of the embodiments disclosed herein.

According to a first specific aspect, there is provided a method of operating a mobile device in a communication network, the method comprising receiving a list of wireless local area network, WLAN, identifiers from the communication network.

In a preferred embodiment, the step of receiving a list of WLAN identifiers further comprises receiving an identifier for the list of WLAN identifiers.

In some embodiments, the identifier for the list of WLAN identifiers comprises a version number and/or a hash value.

In some embodiments, each of the WLAN identifiers in the list is a service set identification, SSID, a basic SSID, BSSID, an extended SSID, ESSID, a homogenous ESSID, HESSID, or HotSpot 2.0.

In some embodiments, the method further comprises the step of using the received list of WLAN identifiers in an access network selection and/or traffic steering procedure.

In some embodiments, the method further comprises the step of sending an indication of the capability of the mobile device to receive a list of WLAN identifiers to the network.

In some embodiments, the method further comprises the step of storing the received list of WLAN identifiers.

In some embodiments, the method further comprises the step of sending an identifier for the stored list of WLAN identifiers to the network.

In some embodiments, the method further comprises the step of removing the stored list of WLAN identifiers following a mobility event, a connectivity event or on expiry of a validity timer for the stored list.

In some embodiments, the method further comprises the step of sending an indication to the network that the mobile device does not have a stored list of WLAN identifiers, or requires a new list of WLAN identifiers, following a mobility event, a connectivity event or on expiry of a validity timer for the stored list.

In some embodiments, the method further comprises the step of receiving an identifier for a list of WLAN identifiers that is valid for the area in which the mobile device is located.

In some embodiments, the method further comprises the step of comparing the received identifier to an identifier for the received list of WLAN identifiers and requesting a list of WLAN identifiers valid for the area in which the mobile device is located, if the received identifier does not match the identifier for the received list of WLAN identifiers.

In some embodiments, the step of receiving a list of WLAN identifiers comprises receiving the list from a radio access network, RAN, node, such as a base station or eNB, or a core network node, such as a mobility management entity, MME.

In some embodiments, the step of receiving a list of WLAN identifiers comprises receiving the list in radio resource control, RRC, or non-access stratum, NAS, signaling.

According to a second aspect, there is provided a mobile device for use in a communication network, the mobile device being configured to receive a list of wireless local area network, WLAN, identifiers from the communication network.

In some embodiments, the mobile device is further configured to use the received list of WLAN identifiers in an access network selection and/or traffic steering procedure.

In some embodiments, the mobile device comprises one or more transceiver units configured to communicate with a wide area network, such as a 3GPP-specified network and a wireless local area network, WLAN, such as a W-Fi network.

Further embodiments of the mobile device are contemplated corresponding to the method embodiments given above.

According to a third aspect, there is provided a method of operating a network node in a communication network, the method comprising sending a list of wireless local area network, WLAN, identifiers to a mobile device.

In a preferred embodiment the step of sending a list of WLAN identifiers further comprises sending an identifier for the list of WLAN identifiers to the mobile device.

In some embodiments, the identifier for the list of WLAN identifiers comprises a version number and/or a hash value.

In some embodiments, each of the WLAN identifiers in the list is a service set identification, SSID, a basic SSID, BSSID, an extended SSID, ESSID, a homogenous ESSID, HESSID, or HotSpot 2.0.

In some embodiments, the list of WLAN identifiers is for use by the mobile device in an access network selection and/or traffic steering procedure.

In some embodiments, the method further comprises the steps of receiving an indication of the capability of the mobile device to receive a list of WLAN identifiers from the mobile device and sending the list of WLAN identifiers in response to the received indication indicating that the mobile device is capable of receiving a list of WLAN identifiers.

In some embodiments, the method further comprises the steps of receiving an identifier for a list of WLAN identifiers stored in the mobile device from the mobile device, determining if the list of WLAN identifiers stored in the mobile device is valid and sending the list of WLAN identifiers to the mobile device if it is determined that the list of WLAN identifiers stored in the mobile device is not valid.

In some embodiments, the step of determining if the list of WLAN identifiers stored in the mobile device is valid comprises determining if the list of WLAN identifiers is valid for the area in which the mobile device is located.

In some embodiments, the method further comprises the steps of receiving a request for a list of WLAN identifiers from the mobile device and sending the list of WLAN identifiers to the mobile device in response to the received request.

In some embodiments, the method further comprises the steps of receiving an indication from the mobile device that the mobile device does not have a stored list of WLAN identifiers and sending the list of WLAN identifiers to the mobile device in response to the received indication.

In some embodiments, the method further comprises the step of determining whether the mobile device has a valid list of WLAN identifiers stored therein following a mobility event or a connectivity event by the mobile device.

In some embodiments, the step of determining whether the mobile device has a valid list of WLAN identifiers comprises comparing the identifier for a valid list of WLAN identifiers to an identifier of a list of WLAN identifiers previously sent to the mobile device.

In some embodiments, the step of determining whether the mobile device has a valid list of WLAN identifiers comprises comparing the identifier for a valid list of WLAN identifiers to an identifier of a list of WLAN identifiers received from the mobile device as part of the mobility event or connectivity event signaling.

In some embodiments, the method further comprises the step of broadcasting an identifier for a list of WLAN identifiers that is valid for a particular area.

In some embodiments, the method further comprises the step of creating a list of WLAN identifiers for use by a mobile device in an access network selection and/or traffic steering procedure.

In some embodiments, the method further comprises the step of creating an identifier for the list of WLAN identifiers, the identifier comprising a version number and/or hash value.

In some embodiments, the network node is a radio access network, RAN, node, such as a base station or eNB, or a core network node, such as a mobility management entity, MME.

In some embodiments, the step of sending a list of WLAN identifiers comprises sending the list in radio resource control, RRC, or non-access stratum, NAS, signaling.

According to a fourth aspect, there is provided a network node for use in a communication network, the network node being configured to send a list of wireless local area network, WLAN, identifiers to a mobile device.

According to a preferred embodiment, the network node is a radio access network, RAN, node, such as a base station or eNB, or a core network node, such as a mobility management entity, MME.

Further embodiments of the network node are contemplated corresponding to the preceding method embodiments.

Also contemplated are computer program products having computer readable code embodied therein, with the computer readable code being configured such that, on execution by a suitable computer or processing unit, the computer or processing unit is caused to perform any of the method embodiments described above.

BRIEF DESCRIPTION OF THE DRAWINGS

Exemplary embodiments of the techniques introduced in this document are described below with reference to the following figures, in which.

DETAILED DESCRIPTION

Figure 1:
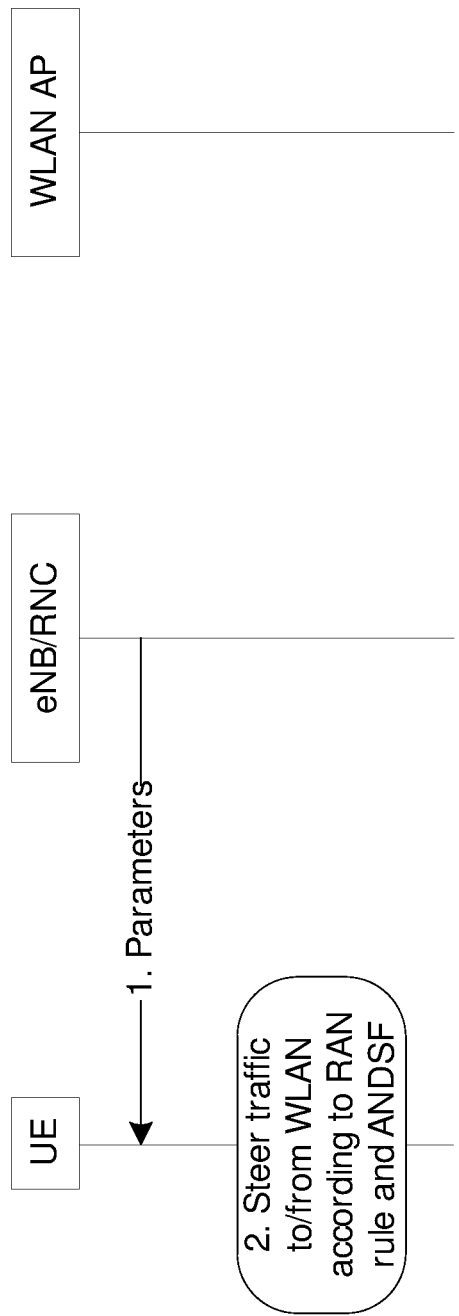
FIG. 1 is a signaling diagram illustrating a technique for network controlled access selection and traffic steering.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application-specific integrated circuits (ASICs), programmable logic arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present techniques may include or encompass, without limitation, digital signal processor (DSP) hardware, a reduced instruction set processor, hardware (e.g., digital or analog) circuitry including but not limited to application specific integrated circuit(s) (ASICs) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "UEs," which is the 3GPP term for end user wireless devices. It should be appreciated, however, that the techniques and apparatus described herein are not limited to 3GPP UEs, but are more generally applicable to end user wireless devices (e.g., portable cellular telephones, smartphones, wireless-enabled tablet computers, etc.) that are useable in cellular systems. It should also be noted that the current disclosure relates to (but is not limited to) end user wireless devices that support both a wireless local area network (WLAN) technology, such as one or more of the IEEE 802.11 standards, and a wide-area cellular technology, such as any of the wide-area radio access standards maintained by 3GPP including LTE and UMTS. End user devices are referred to in Wi-Fi document as "stations," or "STA"—it should be appreciated that the term "UE" as used herein should be understood to refer to a STA, and vice-versa, unless the context clearly indicates otherwise.

Figure 2:
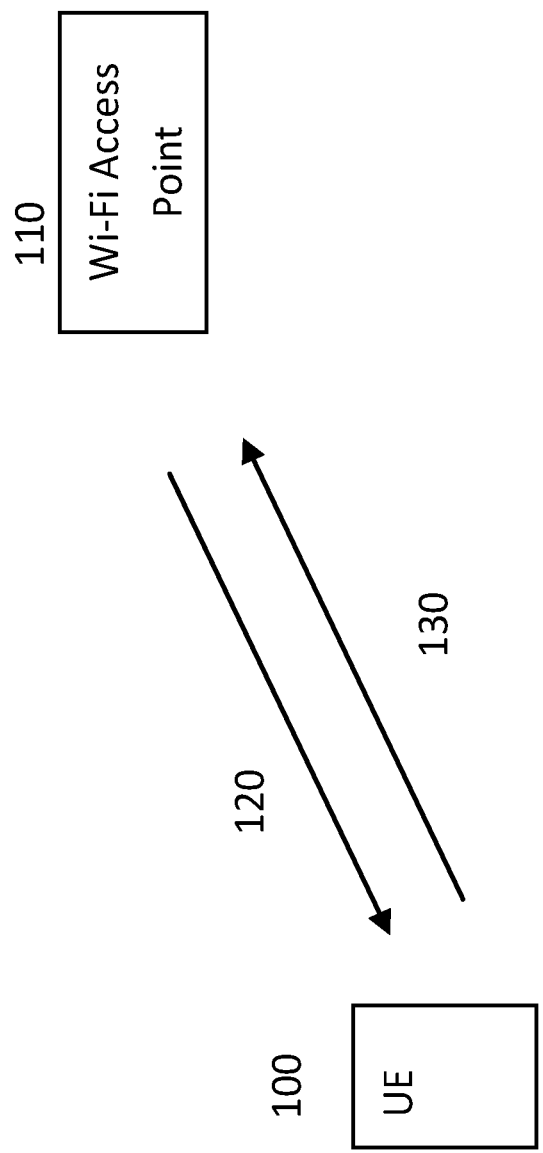
FIG. 2 is a diagram of a wireless terminal and a Wi-Fi access point.

FIG. 2 illustrates a wireless terminal UE 100 able to communicate, using 802.11-specified protocols, with a Wi-Fi access point 110. Downlink communication 120 is directed from the Wi-Fi access point 110 to the UE 100, while uplink communication 130 is directed from the UE 100 to the Wi-Fi access point 110. Note that while the detailed embodiments discussed herein are described in reference to the IEEE 802.11 standards commonly referred to as "Wi-Fi," the techniques and apparatus described are not necessarily limited to those standards, but may be applied more generally to other wireless local area network (WLAN) technologies.

For the UE to find an access point to connect to, a beacon signal is transmitted from the Wi-Fi access point. This beacon signal indicates details about the access point (e.g. the service set identification (SSID), if SSID broadcast is enabled) and provides the UE with enough information to be able to send a request for access. Accessing a Wi-Fi access point includes an information exchange between UE 100 and Wi-Fi Access point 110, including, for example, probe requests and responses, and authentication requests and response. The exact content of these sequences are omitted for clarity.

Figure 3:
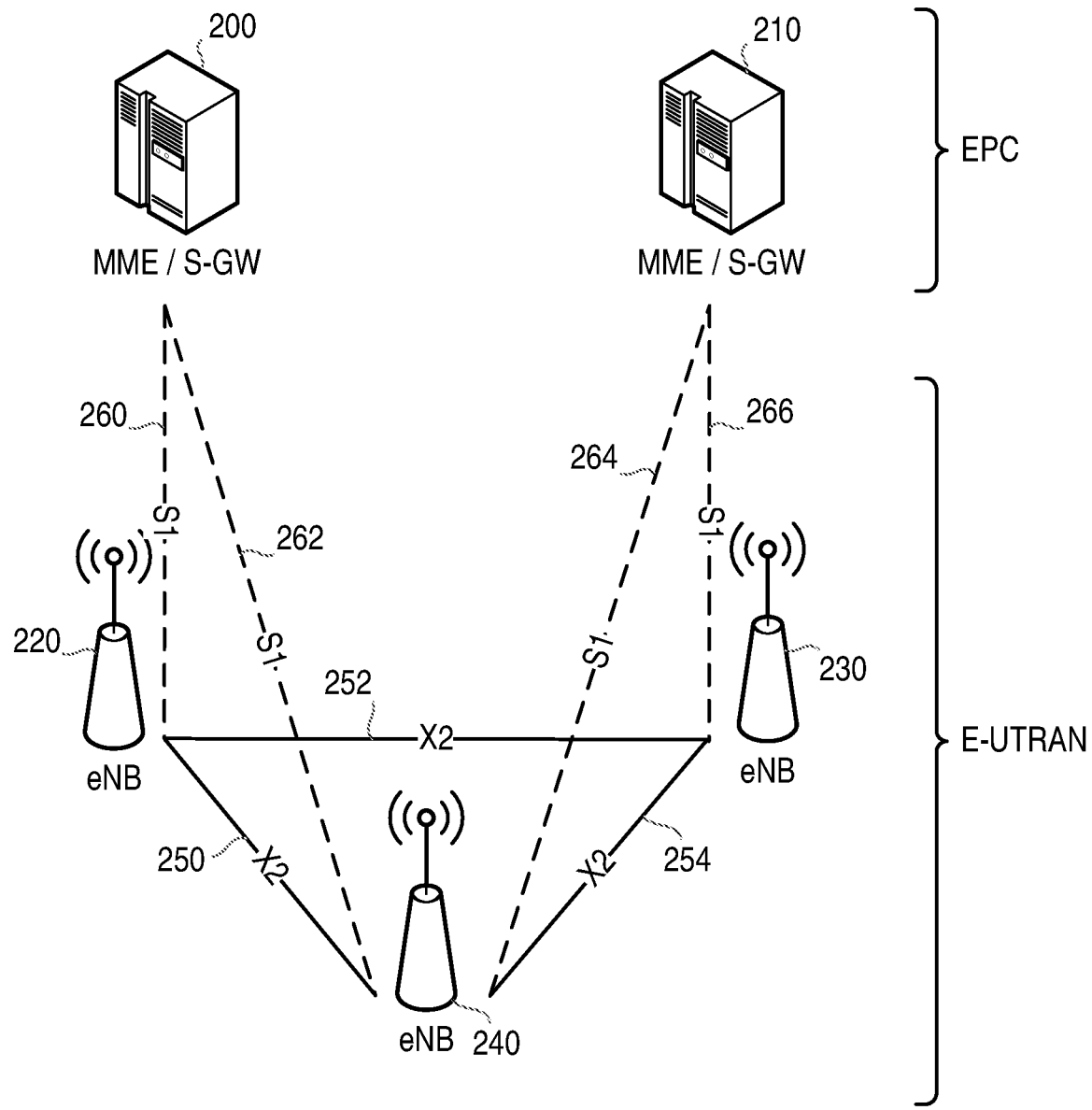
FIG. 3 illustrates a portion of the LTE radio access network and controller nodes.

FIG. 3 illustrates a portion of the LTE radio access network and controller nodes. The LTE network is more formally known as the Evolved UMTS Terrestrial Radio Access Network (E-UTRAN), and includes base stations 220, 230, 240, called enhanced NodeBs (eNBs or eNodeBs), which provide the E-UTRA user plane and control plane protocol terminations towards the User Equipment (UE). It should be noted that even though LTE is used as an example of a 3GPP radio access technology (RAT) herein, the procedures described herein can be applied to other wide-area RATs, including (but not limited to) other 3GPP RATs such as UMTS.

The eNBs are interconnected with each other by means of the X2 interface 250, 252, 254. The eNBs are also connected by means of the S1 interface 260, 262, 264, 266 to the Evolved Packet Core (EPC), and more specifically to Mobility Management Entities (MMEs) 200, 210, by means of the S1-MME interface, and to the Serving Gateway (S-GW) 200, 210 by means of the S1-U interface. The S1 interface supports many-to-many relation between MMEs/S-GWs and eNBs.

The eNB hosts functionalities such as Radio Resource Management (RRM), radio bearer control, admission control, header compression of user plane data towards serving gateway, and routing of user plane data towards the serving gateway. The MME is the control node that processes the signaling between the UE and the core network. The main functions of the MME are related to connection management and bearer management, which are handled via Non Access Stratum (NAS) protocols. The S-GW is the anchor point for UE mobility, and also includes other functionalities such as temporary downlink (DL) data buffering while the UE is being paged, packet routing and forwarding the right eNB, gathering of information for charging and lawful interception. A packet data network (PDN) Gateway (P-GW), which is not shown in FIG. 3, is the node responsible for UE IP address allocation, as well as for Quality-of-Service (QoS) enforcement.

Figure 4:
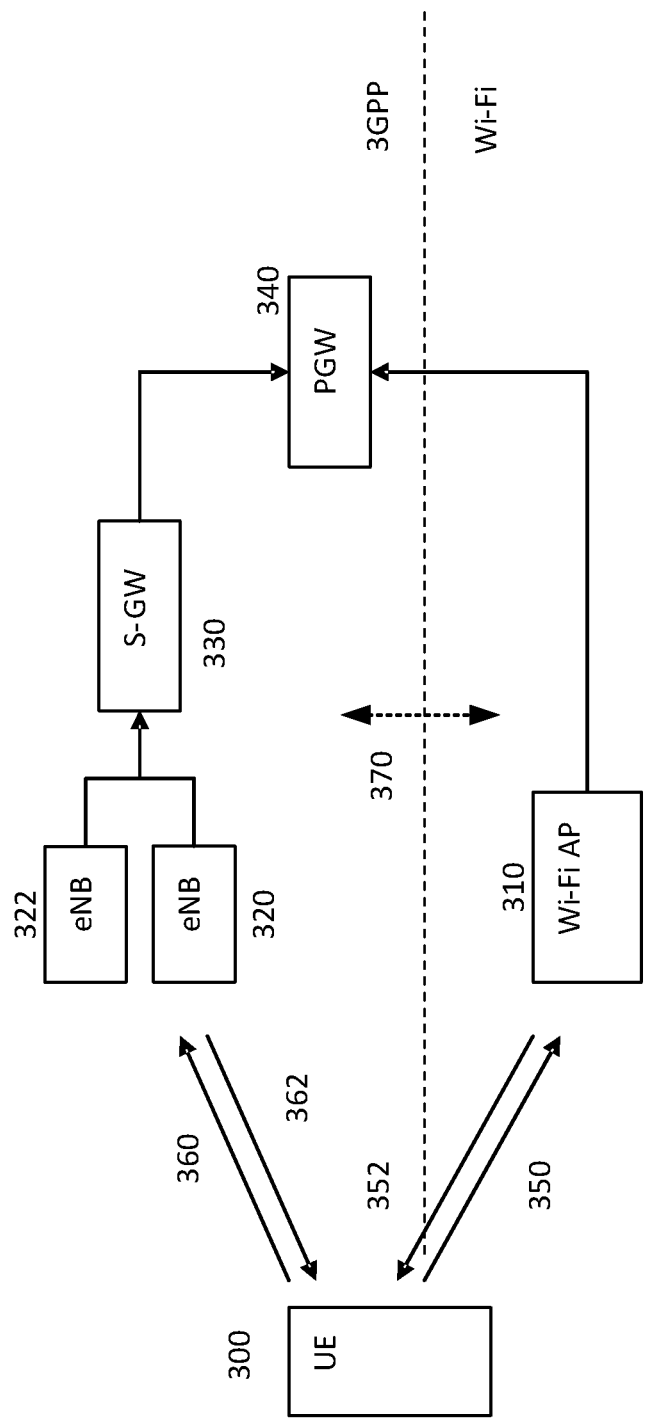
FIG. 4 illustrates a network in which LTE radio access parts and a Wi-Fi wireless access point are both connected to the same core network node.

FIG. 4 illustrates a network where the LTE radio access parts 320, 322 and a Wi-Fi wireless access point 310 are both connected to the same P-GW 340. A UE 300 is capable of being served both from the Wi-Fi Access Point 310 and the LTE eNBs 320, 322. FIG. 4 illustrates one possible way of connecting a Wi-Fi access network to the same core network as the 3GPP-specified access network. It should be noted that the presently disclosed techniques are not restricted to scenarios where the Wi-Fi access network is connected in this way; scenarios where the networks are more separate, e.g., as illustrated in FIGS. 2 and 3, are also possible scenarios.

There can be an interface 370 between the Wi-Fi and 3GPP domains, whereby the two networks can exchange information that can be used to facilitate the steering of traffic over the right network. One example of such information exchanged via the interface 370 is load conditions in the two networks. The two networks can also exchange information with regard to the context of the UE 300, so that each can be aware of whether the UE is being served by the other network, as well as some details of the connection over the other network (e.g. traffic volume, throughput, etc. . . . ).

It should be noted that an access-point controller (AC) functionality exists in the Wi-Fi domain that controls the Wi-Fi AP. This functionality, though not depicted in the figure for the sake of clarity, can be physically located in 310, 340 or it can be another separate physical entity.

Figure 5:
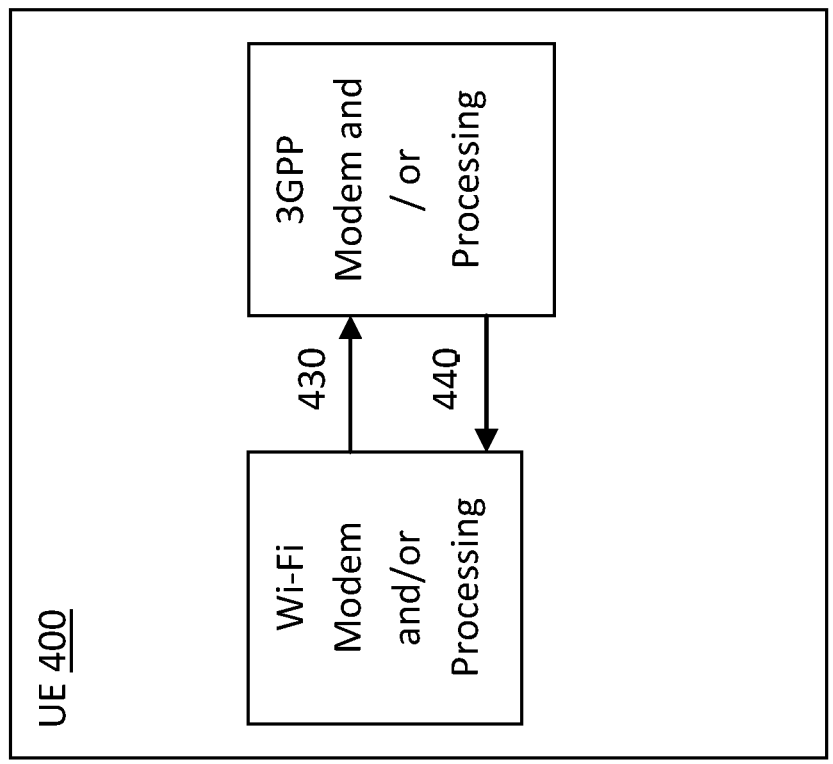
FIG. 5 is a block diagram of an exemplary wireless device capable of communicating both over a 3GPP-specified access technology and a WLAN.

FIG. 5 illustrates an exemplary UE 400 capable of communicating both over a 3GPP-specified access technology and also over an 802.11 Wi-Fi specified access technology. For illustrative purposes, the processing and modem related to the Wi-Fi parts 410 are separated from the processing and modem related to the 3GPP parts 420. It will be appreciated that the implementation of these parts could be integrated on the same hardware unit, or can be carried out using physically distinct hardware and/or hardware-software combinations.

As discussed above, a problem with known solutions for allowing RAN controlled access network selection and/or traffic steering is that currently there is no way for the RAN or a mobility management entity (MME) in the core network (CN) to indicate which WLANs should be candidates for RAN-controlled WLAN selection. However, techniques described herein provide that the RAN or MME (or other node in the core network (CN)) sends the UE a list of WLAN identifiers used for WLAN access selection and traffic steering.

Figure 6:
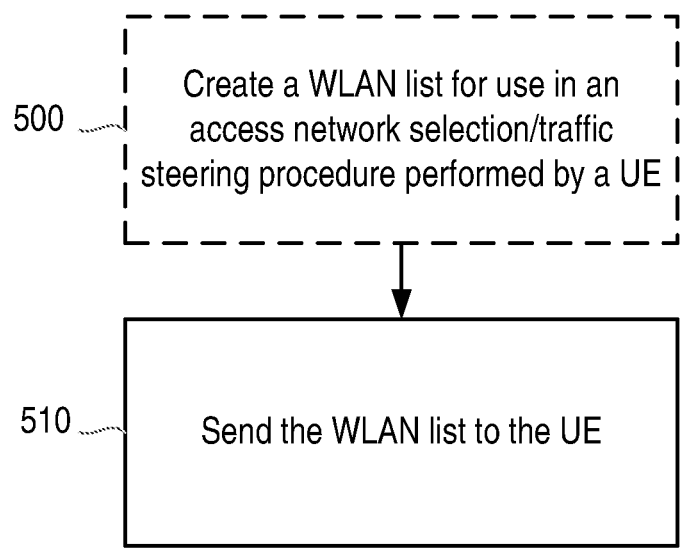
FIG. 6 is a flow chart illustrating an exemplary method of operating a network node according to the disclosed techniques.

FIG. 6 illustrates a method of operating a network node according to these techniques. The network node performing the method in FIG. 6 can be a node in the RAN, such as a base station, eNB or RNC, or a node in the core network, such as an MME. In a first optional step, step 500, the network node creates a WLAN list for use in an access network selection/traffic steering procedure that is to be performed by a mobile device (UE).

The 'WLAN list' or 'list of WLAN identifiers', as used herein, is a list of zero or more identifiers for WLAN access points that the mobile device is allowed to consider when performing access network selection or traffic steering. The APs included in a WLAN list can be any APs in a specific region (e.g. a city/town). This means that the APs included in a WLAN list can include APs not in the coverage area of the cell in which the mobile device is located. In this way, continuous updating of the WLAN list can be avoided. In some embodiments each UE in a region receives the same list, but in other embodiments it is possible to create and send UE-specific WLAN lists (or WLAN lists for specific categories of UEs, such as for UEs with a specific subscription level).

In some embodiments, a specific WLAN list can be provided (for example a WLAN list with zero entries) if the network operator wishes to prevent the UE from accessing or switching traffic to the WLAN.

The identifier for each WLAN access point (AP) included in the WLAN list can be provided in any suitable form, and may comprise, for example, the service set identification (SSID), the basic SSID (BSSID), the extended SSID (ESSID), the homogenous ESSID (HESSID) or HotSpot 2.0. Those skilled in the art will be aware of other forms of information that identify a WLAN AP and that can be included in the WLAN list in addition to or in place of any of the above identifiers.

In some embodiments, step 500 also comprises determining a version number or identifier and assigning it to the WLAN list. It will be appreciated that instead of, or in addition to, a version number, a hash for the WLAN list can be assigned/created which can be used to identify the WLAN list. It will in some places in this document only be explained how version numbers are used, but it should be appreciated that, unless otherwise stated, hashes can be used in addition to or instead of a version number or identifier.

Once the WLAN list has been created in step 500 it is sent to the mobile device in step 510. The WLAN list may be sent to the UE along with the version number, hash or any other suitable WLAN list identifier.

In some cases the WLAN list can be created in step 500 and stored in a memory module of the network node until it is required to be sent to a mobile device.

Figure 7:
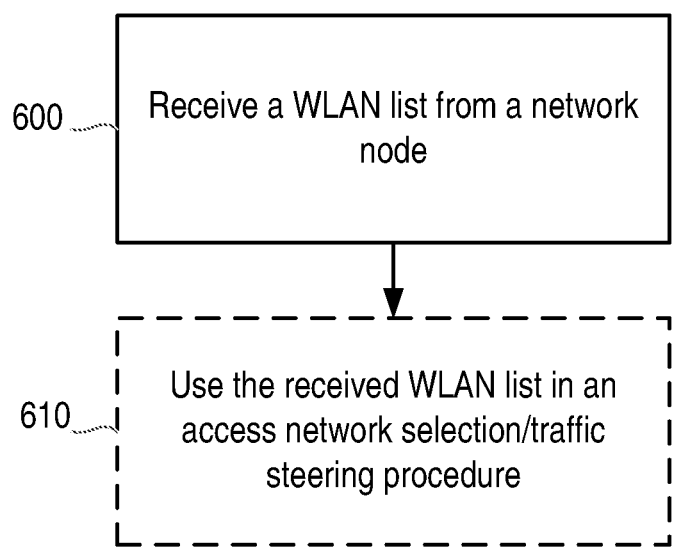
FIG. 7 is a flow chart illustrating an exemplary method of operating a mobile device according to the disclosed techniques.

FIG. 7 illustrates a corresponding method of operating a mobile device. In step 600, the mobile device receives a WLAN list from a network node. As noted above, the WLAN list may be sent to the mobile device along with a version number, hash or other identifier for the WLAN list.

The mobile device stores the WLAN list (and WLAN list identifier if present), and, optionally, uses the received WLAN list in an access network selection/traffic steering procedure (step 610).

Methods for Providing WLAN Lists to Mobile Devices

This section will describe alternative methods for providing the WLAN list to mobile devices (UEs). As noted above, WLAN lists can be created and/or maintained in the RAN and/or the core network. In the examples below the mobility management entity (MME) will be used as an example of a suitable core network node. However, it should be appreciated that this is just an example and it is possible that some other core network node is involved in the provisioning of applicable WLAN lists to the UE.

WLAN List Maintained in RAN

In one set of embodiments, the RAN creates the list of WLANs for a UE and assigns to the list a version number.

If the WLAN lists are residing in the RAN, the MME (or other core network node) may be aware of an identifier of the WLAN list residing in the RAN and know which RAN nodes (e.g. eNBs) have the same WLAN lists. For example eNB A and eNB B may maintain the same WLAN list (for example WLAN list X), while eNB C maintains another WLAN list (for example WLAN list Y). The MME could then know that eNB A and eNB B maintains a WLAN list with index X while eNB C maintains a WLAN list with index Y.

The benefit of RAN-maintained WLAN lists is that as the RAN is aware of the WLANs in the WLAN lists, the RAN has the option to apply different behaviour to different WLANs. If the RAN is not aware of which WLANs the UE is considering in the access network selection or traffic steering, the RAN may not be able to know which WLANs are operator WLANs and which WLANs are non-operator WLANs (e.g. private WLANs), at least without some additional configuration.

WLAN List Maintained in MME

In one embodiment the MME creates the list of WLANs for a UE and assigns to the list a version number or hash. The MME can signal the WLAN list to the UE, for example by NAS signalling and/or by delivering it to the RAN using e.g. S1 signalling, where the RAN will deliver it to the UE using e.g. radio resource control (RRC) signalling.

Triggers for WLAN List Provisioning

An update to a WLAN list held or stored by a mobile device (UE) (with 'update' meaning that the network sends the UE a new WLAN list) can be triggered in a number of different ways. WLAN list update can be triggered by, for example, any of the following three entities; UE, RAN or MME. Examples of how this can be done is illustrated in the subsections below.

UE Triggered WLAN List Provisioning

In this approach the UE will trigger an update of its stored WLAN list.

In one embodiment the UE can trigger such an update upon entering a new tracking area (or Routing Area in UTRAN or Location Area in GSM), i.e. if the tracking area code (TAC) for the current cell is different from the TAC the UE currently has. It should be noted that the UE may have multiple tracking areas (such as in UMTS), in which case the UE may not trigger a WLAN list update if the tracking area for the current cell is equivalent to the tracking area which the UE has in its tracking area list.

In one embodiment a RAN node (e.g. eNB) will broadcast or send in a dedicated message a version number and/or hash corresponding to the WLAN list that should be used by the UE when the UE is associated with that eNB. This version number and/or hash can be used by the UE to determine if the UE has the correct WLAN list. For example, if the UE has a WLAN list with version number X and the RAN node with which the UE is associated indicates a WLAN list with version number Y is required, the UE would know that the WLAN list the UE maintains is not valid/up to date for that eNB.

If the UE-triggered approach is applied the UE will request the entity that maintains/provides the WLAN lists to obtain a valid WLAN list. Where the RAN is the entity that maintains/provides the WLAN lists, the UE can send a message to the RAN indicating that the UE needs a valid WLAN list. The RAN may then signal the WLAN list to the UE in a response message. These messages can, for example, be radio resource control (RRC) messages; although other types of messages could be used instead.

Where the MME is the entity that maintains/provides the WLAN lists, the UE can send a message to the MME indicating that the UE needs a valid WLAN list. The MME may then signal the WLAN list to the UE in a response message. These messages can, for example, be NAS messages, although other types of messages could be used instead.

In other embodiments, the UE could trigger an update to/replacement of the WLAN list on expiry of a WLAN list validity timer or on the occurrence of some other similar event. The value of the WLAN list validity timer could be predefined in the UE or it could be signalled by a network node to the UE (for example in conjunction with the sending of the WLAN list).

RAN Triggered WLAN List Provisioning

In this approach the eNB will trigger an update of a WLAN list stored in a UE.

In one embodiment the RAN will trigger an update on detecting that the UE has initiated a NAS procedure (e.g. a NAS service request, a tracking area update or a NAS attach). The knowledge of when the UE performs these procedures could be indicated by the UE or by the MME, or it could be detected implicitly based on the amount of signalling or cause values used, etc.

In one embodiment the UE indicates to the RAN (for example in an RRC message) the version number of the WLAN list the UE has and the RAN could, based on this knowledge, trigger an update of the UE's WLAN list. If the UE has not yet received a WLAN list, the UE could indicate this to the RAN node, for example by sending a message to the RAN node that contains a predefined value that indicates this status. Where the UE sends the version number to the RAN node, this can be done in a number of different ways (note that one or more of these alternatives may be used):

Upon RAN request.
    Upon occurrence of some event, such as initial association, tracking area update, handover, establishment of RRC connection to the RAN node, etc.
    Upon expiration of a timer.

If the RAN creates/maintains the WLAN list (as described above) the RAN could generate an up to date WLAN list for the UE and send the WLAN list in a message (for example an RRC message) to the UE.

If the MME is the entity which creates/maintains the WLAN list (also as described above) the RAN can indicate to the MME that the UE's WLAN list needs updating. It is also possible for the MME to generate the WLAN list and provide this WLAN list to the RAN, and for the RAN to send the WLAN list to the UE in an RRC (or similar) message.

In one embodiment it is possible to trigger the sending of the new WLAN list to the UE if the UE enters a RRC connected state or performs a handover and the RAN (or target RAN) receives an indication in the UE capabilities that the UE supports receiving a WLAN list.

In another embodiment the RAN can send the new WLAN list to one or more UEs if the WLAN list maintained by the RAN has changed (for example if a new or updated WLAN list has been provided by an Operation and Maintenance system of the RAN).

MME Triggered WLAN List Provisioning

In this approach the MME will trigger an update to a WLAN list stored in a UE.

In one embodiment the UE indicates the version number of its stored WLAN list to the MME, and the MME will determine if the WLAN list is up to date. If the UE has not yet received a WLAN list, the UE could indicate this to the MME, for example by sending a message to the MME that contains a predefined value that indicates this status. If the MME determines that the WLAN list for the UE is not up to date (including if the UE does not yet have a WLAN list) the MME may trigger a WLAN list update. If the WLAN list is up to date the MME may refrain from triggering a WLAN list update.

The UE may indicate to the MME which WLAN list version it has upon:
  Tracking area update (it will be appreciated that a similar concept to tracking areas is applicable in other communication technologies)
  Expiration of a timer.
  Explicit request from a network node. The node may be the MME itself or some other network node, e.g. a RAN node.

In one embodiment the MME can determine which WLAN list version the UE has by determining which WLAN list/lists the UE has received previously, and trigger a WLAN list update when the UE's WLAN list is not valid. For example, if the MME provides WLAN list A in tracking areas X and Y and WLAN list B in tracking area Z, the MME will be able to determine that if a UE has been provisioned with a WLAN list in tracking area X, the UE can continue to use this WLAN list when it is in tracking area Y. However, the MME will know if the UE enters tracking area Z, a WLAN list provisioning will need to be triggered since the UE should be using WLAN list B.

In the above embodiment, if the UE's current WLAN list was provided by another entity in the network (e.g. another MME) then the MME may be able to know which WLAN list was provided through coordination between the MME and the other entity (e.g. the other MME).

If the MME is the entity which maintains the WLAN list (as described above) the MME could generate an up to date WLAN list for the UE and send the WLAN list in a message (for example in a NAS message) to the UE. Alternatively, the MME can generate the WLAN list and provide the list to the RAN, and the RAN can send the WLAN list to the UE, for example in an RRC message.

If the RAN maintains the WLAN list (as described above) the MME can indicate to the RAN that the UE's WLAN list needs updating. The RAN node can then send an up to date WLAN list with the associated version number to the UE.

In one embodiment it is possible for the MME to trigger the sending of a new WLAN list to the UE if the UE enters a specific state (e.g. EPS Mobility Management (EMM) Connected state) or performs a handover and the RAN (or target RAN) receives an indication in the UE capabilities that the UE supports receiving the WLAN list.

In another embodiment the MME can send a WLAN list to one or more UEs if the WLAN list has changed (e.g. if a new or updated WLAN list has been provided by an Operation and Maintenance system of the MME).

Figure 8:
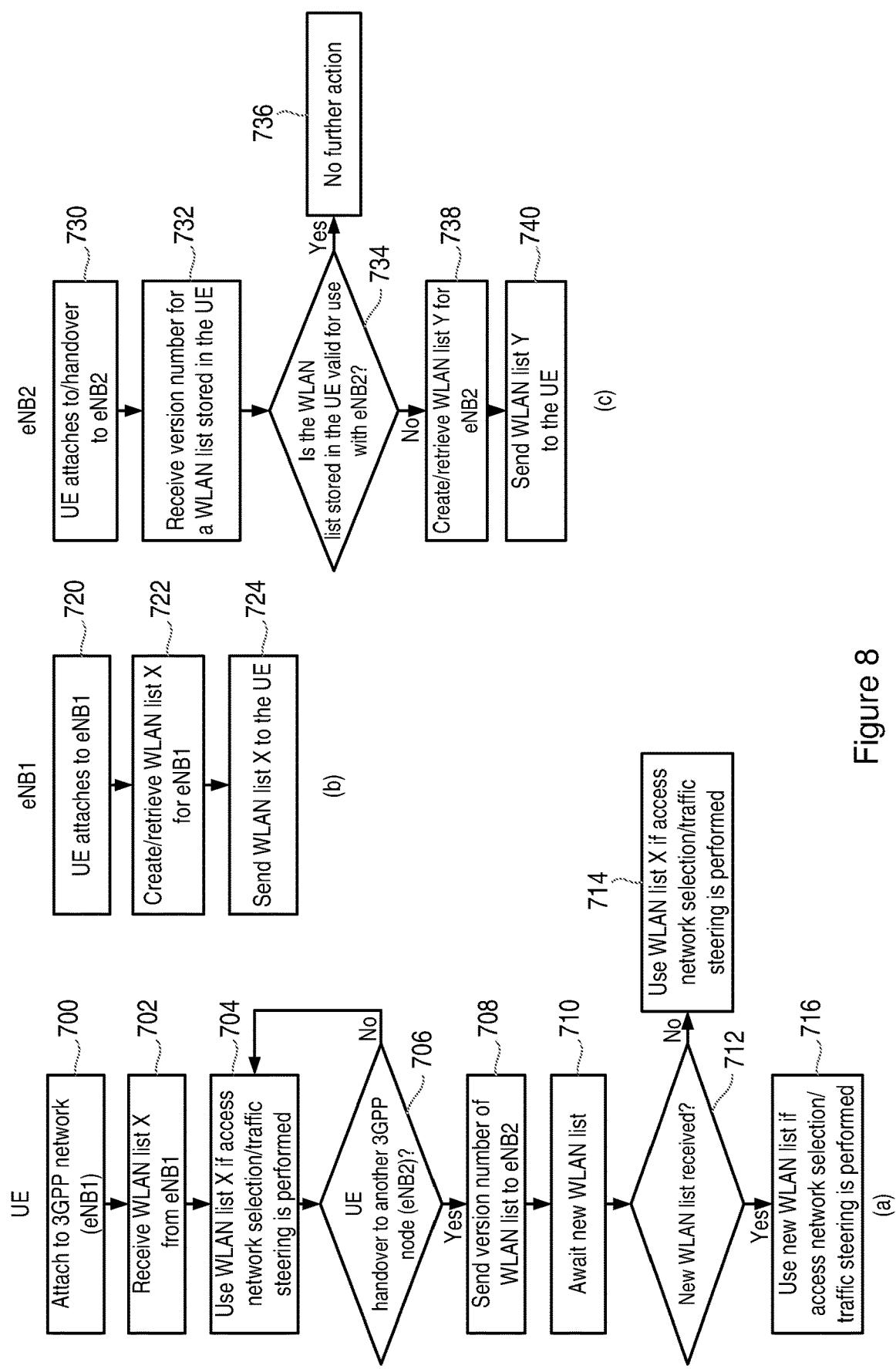
FIG. 8 is a set of flow charts illustrating the operation of a mobile device and two separate RAN nodes according to an exemplary embodiment.

The flow charts in FIG. 8 illustrate a first exemplary embodiment of the above techniques. Three flow charts are shown in FIG. 8, the first (FIG. 8(a)) shows the method steps performed in a UE, the second (FIG. 8(b)) shows the method steps performed in a first node (denoted eNB1) in the RAN and the third (FIG. 8(c)) shows the method steps performed in a second node (denoted eNB2) in the RAN.

In a first step (steps 700 and 720), a UE attaches to the 3GPP network, and specifically, eNB1.

The RAN node to which the UE connects (eNB1) creates a WLAN list for the UE (if not already created) and assigns version number X to the WLAN list, or retrieves a previously created WLAN list X from a memory (step 722).

The RAN node (eNB1) sends the WLAN list with version number X to the UE (step 724).

The UE receives this WLAN list with version number X (step 702) and stores it locally in the UE.

If an access network selection or traffic steering process is or needs to be performed by the UE, the UE uses the received WLAN list in this process (step 704).

Subsequently (steps 706 and 730), the UE performs a handover to another 3GPP node (eNB2 in this example).

In this embodiment, when the UE performs the handover to eNB2, the UE sends an indication of the version number, i.e. X, of the WLAN list it received from the previous node (steps 708). The UE then waits for a new WLAN list from eNB2 (if one is required)—step 710. If no new WLAN list is received, the UE uses the stored WLAN list X when an access network selection or traffic steering procedure is performed (steps 712, 714). If a new WLAN list is received (e.g. a WLAN list with version number Y), the UE stores the new WLAN list (and optionally deletes WLAN list X from memory). The UE then uses WLAN list Y when an access network selection or traffic steering procedure is performed (step 716).

In step 732 the eNB2 receives the indication of the version number of the WLAN list sent by the UE in step 708 and determines whether the WLAN list stored in the UE is valid for use with eNB2 (step 734). If the WLAN list with version number X is valid in eNB2, then it is not necessary for any new WLAN list to be sent to the UE (step 736). However if WLAN list X is not valid for eNB2 (for example if WLAN list X does not appear on a list of valid WLAN lists for eNB2 or does not match the WLAN list valid for eNB2, e.g. WLAN list Y) then eNB2 creates a WLAN list Y for the UE (or retrieves the WLAN list with identifier Y from a memory of the eNB2), step 738, and sends the WLAN list to the UE (step 740). As noted above, the UE receives the new WLAN list Y and uses this in future access network selection or traffic steering procedures.

Figure 9:
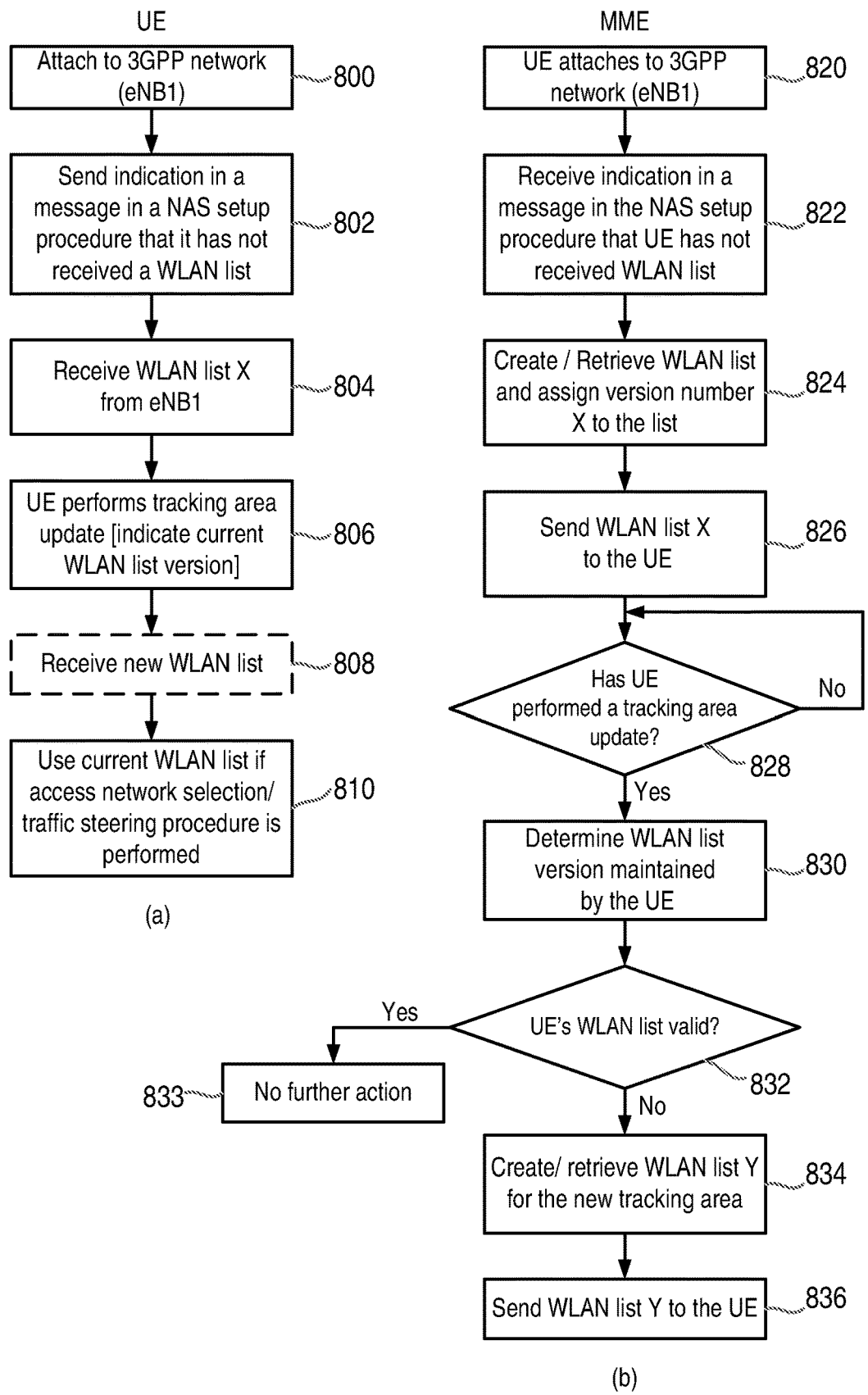
FIG. 9 is a set of flow charts illustrating the operation of a mobile device and a core network node according to another exemplary embodiment.

The flow charts in FIG. 9 illustrate a second exemplary embodiment of the above techniques. Two flow charts are shown in FIG. 9, the first (FIG. 9(a)) shows the method steps performed in a UE, and the second (FIG. 9(b)) shows the method steps performed in a node in the core network (e.g. the MME).

In a first step (steps 800 and 820), a UE attaches to the 3GPP network (e.g. a node in the RAN denoted eNB1).

In this embodiment, when the UE attaches to eNB1, the UE sends an indication that it has not received a WLAN list to the MME (step 802). This indication can be included in a message that is sent during the NAS setup procedure, and can be indicated by a predefined value which indicates that the UE has not received a WLAN list. It should be appreciated that in this embodiment the UE can send the indication that it has not received a WLAN list even if the UE has a stored WLAN list, since in this embodiment it will trigger the provision of an up to date WLAN list from the network.

On receipt of this indication from the UE (step 822), the MME creates a WLAN list for the UE (if not already created) and assigns version number X to the WLAN list, or (if previously created) retrieves WLAN list X from a memory (step 824). The MME then sends the WLAN list X to the UE (steps 826).

The UE receives this WLAN list with version number X (step 804) and stores it locally in the UE. If an access network selection or traffic steering process is or needs to be performed by the UE (step 810), the UE uses the received WLAN list X in this process.

If the UE subsequently moves to another tracking area, or performs some other mobility or connectivity event, the UE will perform a tracking area update (step 806).

If the UE performs a tracking area update, the MME will determine what WLAN list version is stored in the UE (steps 828 and 830). In some embodiments, the MME can determine this from the version number of the WLAN list last sent to the UE by the MME, and/or from an indication of the WLAN list stored in the UE that the UE signals during the tracking area update procedure, etc.

If it is determined that the WLAN list stored in the UE is valid then no WLAN list update is needed (step 833). However if it is determined that the WLAN list stored by the UE is not valid in the tracking area to which the UE has moved, the MME creates (if not yet created) a valid WLAN list for the new tracking area and assigns a version number to it, or retrieves a previously created WLAN list that is valid for the tracking area from a memory (step 834) and sends the WLAN list and the version number to the UE (step 836).

The UE receives the new WLAN list (step 808), stores it in a memory and uses the WLAN list if an access network selection or traffic steering process is or needs to be performed by the UE (step 810).

Apparatus

Although the described solutions may be implemented in any appropriate type of telecommunication system supporting any suitable communication standards and using any suitable components, network-based embodiments of the described solutions may be implemented in one or more nodes of a radio access network (RAN), such as a node in a 3GPP RAN network, such as LTE, or one or more nodes of a core network (CN) in a 3GPP network. These RAN nodes include, but are not limited to, an eNodeB in an LTE network, or a base station or RNC in a UMTS network, and the CN nodes include, but are not limited to, a mobility management entity (MME) in an LTE network.

The network in which these techniques are implemented may further include any additional elements suitable to support communication between wireless devices or between a wireless device and another communication device (such as a landline telephone). Although the illustrated network nodes may represent a network communication device that includes any suitable combination of hardware and/or software, these network nodes may, in particular embodiments, represent a device such as the example network node 900 illustrated in greater detail by FIG. 10. Similarly, although the illustrated base station nodes (e.g., an eNB) may represent network nodes that include any suitable combination of hardware and/or software, these network nodes may, in particular embodiments, represent devices such as the example network node 1000 illustrated in greater detail by FIG. 11.

Figure 10:
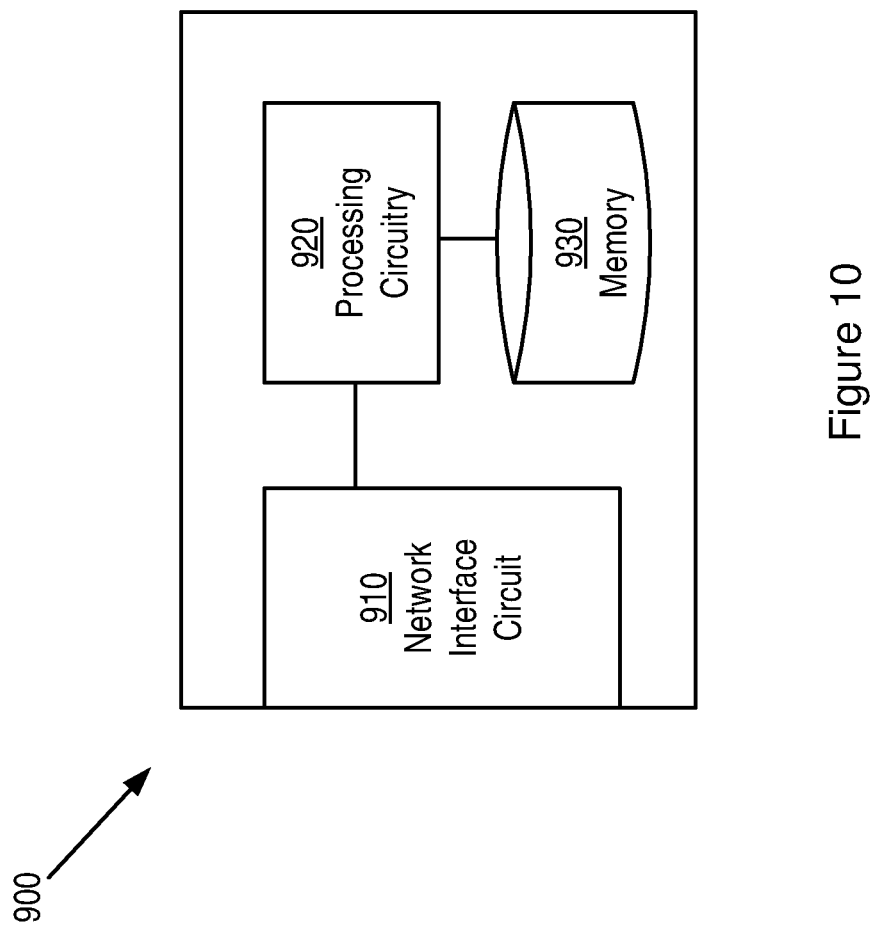
FIG. 10 is a block diagram of an exemplary network node.

As shown in FIG. 10, the example network node 900 includes processing circuitry 920, a memory 930, and network interface circuitry 910. In particular embodiments, some or all of the functionality described above as being provided by a core network node or a node in a RAN may be provided by the processing circuitry 920 executing instructions stored on a computer-readable medium, such as the memory 930 shown in FIG. 10. Alternative embodiments of the network node 900 may include additional components beyond those shown in FIG. 10 that may be responsible for providing certain aspects of the node's functionality, including any of the functionality described above and/or any functionality necessary to support the solutions described above.

Figure 11:
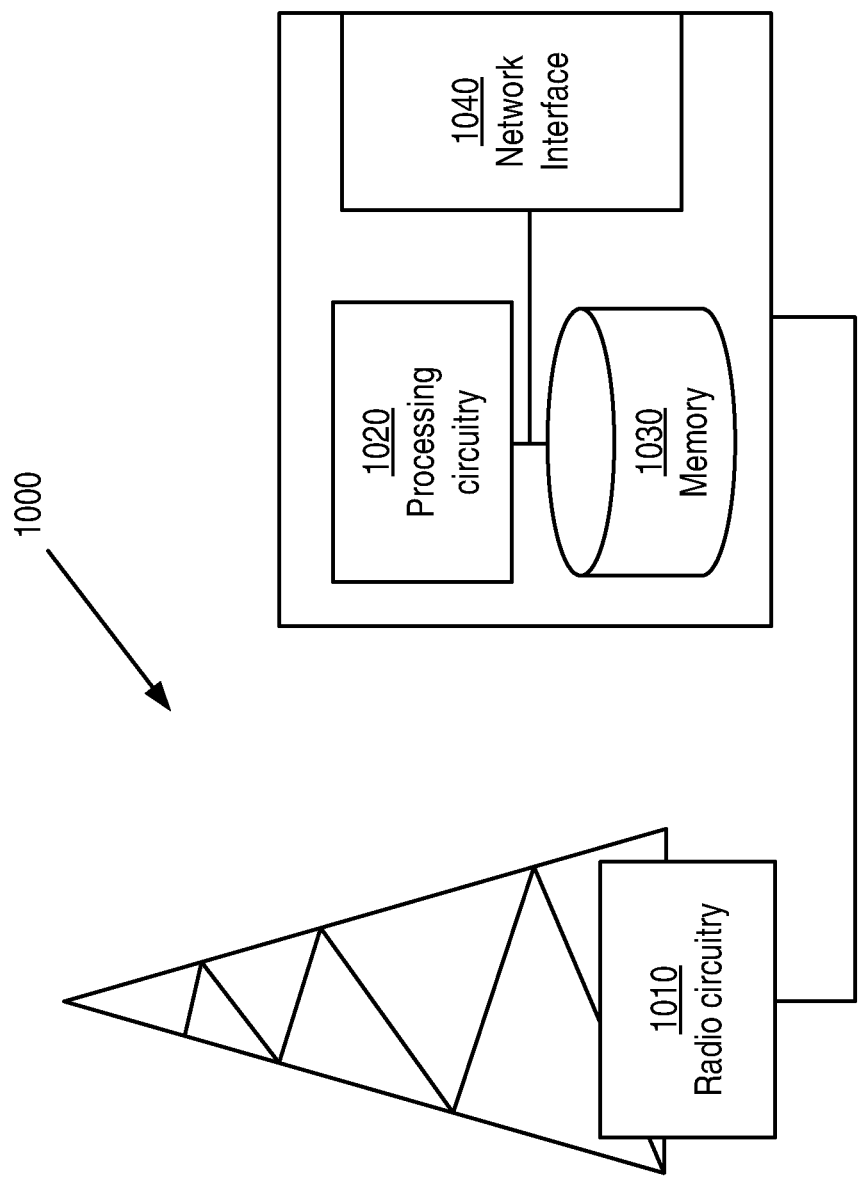
FIG. 11 is a block diagram of an exemplary base station.

As shown in FIG. 11, an example base station 1000 includes processing circuitry 1020, a memory 1030, radio circuitry 1010, and at least one antenna. The processing circuitry 1020 may comprise RF circuitry and baseband processing circuitry (not shown). In particular embodiments, some or all of the functionality described above as being provided by a mobile base station, a radio network controller, a base station controller, a relay node, a NodeB, an enhanced NodeB, and/or any other type of mobile communications node may be provided by the processing circuitry 1020 executing instructions stored on a computer-readable medium, such as the memory 1030 shown in FIG. 11. Alternative embodiments of the network node 1000 may include additional components responsible for providing additional functionality, including any of the functionality identified above and/or any functionality necessary to support the solution described above.

Figure 12:
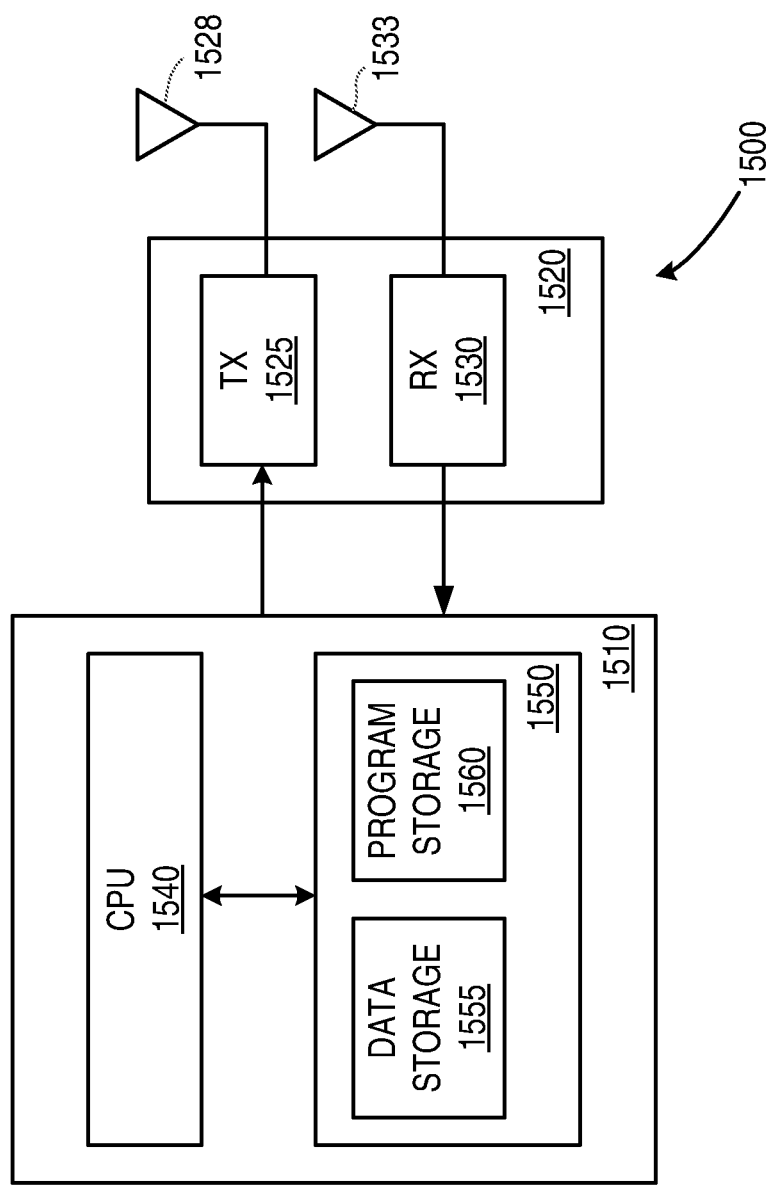
FIG. 12 is a block diagram of an exemplary mobile device.

Several of the terminal-based techniques and methods described above may be implemented using radio circuitry and electronic data processing circuitry provided in a terminal. FIG. 12 illustrates features of an example terminal 1500 according to several embodiments of the present invention. Terminal 1500, which may be a UE configured for operation with an LTE network (E-UTRAN) and that also supports Wi-Fi, for example, comprises a transceiver unit 1520 for communicating with one or more base stations as well as a processing circuit 1510 for processing the signals transmitted and received by the transceiver unit 1520. Transceiver unit 1520 includes a transmitter 1525 coupled to one or more transmit antennas 1528 and receiver 1530 coupled to one or more receiver antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE. Note also that transmitter unit 1520 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the techniques presented herein, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 12, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Because terminal 1500 supports multiple radio access networks, processing circuit 1510 may include separate processing resources dedicated to one or several radio access technologies, in some embodiments. Again, because the various details and engineering tradeoffs associated with the design of baseband processing circuitry for mobile devices are well known and are unnecessary to a full understanding of the techniques described herein, additional details are not shown here.

Typical functions of the processing circuit 1510 include modulation and coding of transmitted signals and the demodulation and decoding of received signals. In several embodiments of the disclosed techniques, processing circuit 1510 is adapted, using suitable program code stored in program storage memory 1560, for example, to carry out one of the techniques described above for access network selection. Of course, it will be appreciated that not all of the steps of these techniques are necessarily performed in a single microprocessor or even in a single module.

It will be appreciated by the person of skill in the art that various modifications may be made to the above described embodiments without departing from the scope of the presently disclosed techniques. For example, it will be readily appreciated that although the above embodiments are described with reference to parts of a 3GPP network, embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments have been described in detail above, with reference to the attached illustrations of specific embodiments. Because it is not possible, of course, to describe every conceivable combination of components or techniques, those skilled in the art will appreciate that the presently disclosed techniques can be implemented in other ways than those specifically set forth herein. The present embodiments are thus to be considered in all respects as illustrative and not restrictive.

The invention claimed is:

1. A method, in a mobile device operating in a communication network, the method comprising:
receiving, from the communication network, a list of wireless local area network (WLAN) identifiers for use in an access network selection or traffic steering procedure performed by the mobile device,
storing the received list of WLAN identifiers and
removing the stored list of WLAN identifiers in response to a mobility event, or a connectivity event, or expiry of a validity timer for the stored list.

2. The method of claim 1, wherein the step of receiving a list of WLAN identifiers further comprises receiving an identifier for the list of WLAN identifiers.

3. The method of claim 2, wherein the identifier for the list of WLAN identifiers comprises a version number, or a hash value, or both a version number and a hash value.

4. The method of claim 1, wherein each of the WLAN identifiers in the list is a service set identification (SSID), a basic SSID (BSSID), an extended SSID (ESSID), a homogenous ESSID (HESSID), or HotSpot 2.0.

5. The method of claim 1, the method further comprising the step of:
using the received list of WLAN identifiers in an access network selection procedure or a traffic steering procedure, or both an access network selection procedure and a traffic steering procedure.

6. The method of claim 1, the method further comprising the step of:
sending an indication to the communication network that the mobile device does not have a stored list of WLAN identifiers, or requires a new list of WLAN identifiers, following a mobility event, a connectivity event or on expiry of a validity timer for the stored list.

7. The method of claim 1, the method further comprising the step of:
receiving an identifier for a list of WLAN identifiers that is valid for an area in which the mobile device is located.

8. The method of claim 7, the method further comprising the step of:
comparing the received identifier for the list of WLAN identifiers that is valid for the area in which the mobile device is located to an identifier for the received list of WLAN identifiers; and
requesting a list of WLAN identifiers valid for the area in which the mobile device is located if the received identifier does not match the identifier for the received list of WLAN identifiers.

9. A mobile device for use in a communication network, the mobile device being configured to:
receive a list of wireless local area network (WLAN) identifiers from the communication network,
use the list of WLAN identifiers in an access network selection or traffic steering procedure performed by the mobile device,
the mobile device being configured to store the received list of WLAN identifiers and the mobile device being further configured to remove the stored list of WLAN identifiers in response to a mobility event, or a connectivity event, or expiry of a validity timer for the stored list.

10. The mobile device of claim 9, the mobile device comprising:
one or more transceiver units configured to communicate with a wide area network and a wireless local area network (WLAN).

11. The mobile device of claim 9, wherein the mobile device is further configured to receive an identifier for the list of WLAN identifiers.

12. The mobile device of claim 9, wherein each of the WLAN identifiers in the list is a service set identification (SSID), a basic SSID (BSSID), an extended SSID (ESSID), a homogenous ESSID (HESSID), or HotSpot 2.0.

13. The mobile device of claim 9, wherein the mobile device is further configured to send an identifier for the stored list of WLAN identifiers to the communication network.

14. The mobile device of claim 9, wherein the mobile device is further configured to send an indication to the communication network that the mobile device does not have a stored list of WLAN identifiers, or requires a new list of WLAN identifiers, following a mobility event, a connectivity event or on expiry of a validity timer for the stored list.

15. The mobile device of claim 9, wherein the mobile device is further configured to receive an identifier for a list of WLAN identifiers that is valid for an area in which the mobile device is located.

16. The mobile device of claim 15, wherein the mobile device is further configured to compare the received identifier for the list of WLAN identifiers that is valid for the area in which the mobile device is located to an identifier for the received list of WLAN identifiers and request a list of WLAN identifiers valid for the area in which the mobile device is located if the received identifier does not match the identifier for the received list of WLAN identifiers.

* * * * *